United States Patent [19]
Tanaka et al.

[11] Patent Number: 5,515,051
[45] Date of Patent: May 7, 1996

[54] WIRELESS SIGNALING SYSTEM

[75] Inventors: Junji Tanaka, Yamatokoriyama; Katsunori Takeda, Nara, both of Japan

[73] Assignee: Sharp Kabushiki Kaisha, Osaka, Japan

[21] Appl. No.: 26,849

[22] Filed: Mar. 5, 1993

[30] Foreign Application Priority Data

Mar. 30, 1992 [JP] Japan ................. 4-074489

[51] Int. Cl.⁶ ...................................... H04B 10/00
[52] U.S. Cl. .................. 341/174; 345/168; 345/169; 340/825.44
[58] Field of Search .................. 345/168, 169; 364/708; 359/142, 154; 341/173, 174; 340/825.69, 825.72, 825.44, 311.1; 455/32.1

[56] References Cited

U.S. PATENT DOCUMENTS

| | | | |
|---|---|---|---|
| 4,135,156 | 1/1979 | Sanders, Jr. et al. | 325/4 |
| 4,814,552 | 3/1989 | Stefik et al. | 178/18 |
| 5,136,285 | 8/1992 | Okuyama | 340/539 |
| 5,189,543 | 2/1993 | Lin et al. | 359/142 |
| 5,247,285 | 9/1993 | Yokota et al. | 345/169 |
| 5,287,245 | 2/1994 | Lucente et al. | 361/680 |
| 5,297,144 | 3/1994 | Gilbert et al. | 370/95.2 |
| 5,302,970 | 4/1994 | Lakso et al. | 345/168 |
| 5,307,297 | 4/1994 | Iguchi et al. | 364/708.1 |
| 5,319,698 | 6/1994 | Glidewell et al. | 340/539 |

FOREIGN PATENT DOCUMENTS

| | | |
|---|---|---|
| 61-9717 | 1/1986 | Japan . |
| 62-168218 | 7/1987 | Japan . |
| 2-81114 | 3/1990 | Japan . |
| 2-304611 | 12/1990 | Japan . |
| 2-277097 | 12/1991 | Japan . |

Primary Examiner—James J. Groody
Assistant Examiner—Glenton B. Burgess
Attorney, Agent, or Firm—Nixon & Vanderhye

[57] ABSTRACT

A wireless signaling system includes a plurality of transmitters and a single receiver. The transmitter sequentially transmits serial data blocks to the receiver. Each data block includes a transmitter identification code and predetermined time intervals defining the beginning and end of the data block. The receiver receives the data block, detects the time intervals before and after the received data block to recognize reception of a complete data block, and checks the transmitter identification code included in the received data block to identify the transmitter.

24 Claims, 8 Drawing Sheets

WIRELESS SIGNALING SYSTEM

FIELD OF THE INVENTION

The present invention relates to a wireless signaling system between a plurality of transmitters and a single receiver, and more particularly to a wireless signaling system to be used in the case where digital data information is directed to a word processor or personal computer by wireless transmission.

DESCRIPTION OF THE RELATED ART

In the conventional case of a wireless remote controller of a TV or VTR, wireless signals are handled between a single unit of a transmitter and a single unit of a receiver, wherein the transmitter is normally provided on the front face of the remote controller, and the receiver is provided on the front of the receiving device. A similar transmission means has also been utilized in the field of an information processing system. Japanese Unexamined Patent Publication No. 9717/1986 discloses "A Method for Controlling An Electronic Device" in which remote control is carried out by means of a wireless keyboard. Japanese Unexamined Patent Application No. 168218/1987 discloses "A Separable Keyboard" in which a keyboard can be divided into two or more keyboard portions which can transmit wireless signals.

In such situations noted above, it is likely that the transmitters transmit data asynchronously, and thus the receiver sometimes receives data from a plurality of different transmitters. Accordingly, there is possible confusion in that the receiver may erroneously recognize a part of data as an entire data transmission. Consequently, it is problematic to accurately receive the data and identify a proper transmitter from which the data is transmitted.

SUMMARY OF THE INVENTION

It is an object of the present invention to provide a wireless signaling system in which a receiver can selectively receive an entire data transmission from one transmitter of a plurality of transmitters and can accurately identify the proper transmitter without confusion.

The present invention provides a wireless signaling system comprising a plurality of transmitters and a single receiver. One of the transmitters sequentially transmits serial data blocks to the receiver, and each data block includes a transmitter identification code, and a predetermined time interval for separating the following data block. The receiver receives the data block, detects the time intervals before and after the received data block to recognize the receive data block as a complete data block, and checks the transmitter identification code included in the received data block to identify the transmitter.

The serial data block may comprise a plurality of bit blocks having a constant time interval therebetween, the constant time interval being shorter than the predetermined time interval. The predetermined time interval may be determined based on the transmitter's identification code. The receiver checks the predetermined time period before and after the received data block and the transmitter identification code to identify the transmitter.

Preferably, the system is installed in a word processor system including a word processor body, a wireless keyboard unit and a wireless character reader unit. Transmitters are installed in the wireless keyboard unit and the wireless character reader unit to transmit output data from the two units to the word processor body. The receiver installed in the word processor body receives the transmitted data from the two units.

DETAILED DESCRIPTION OF THE PREFERRED EMBODIMENT

A preferred embodiment of the present invention will be described in detail with reference to the drawings. The present invention should not be construed as being limited by the following embodiment.

Figure 1:
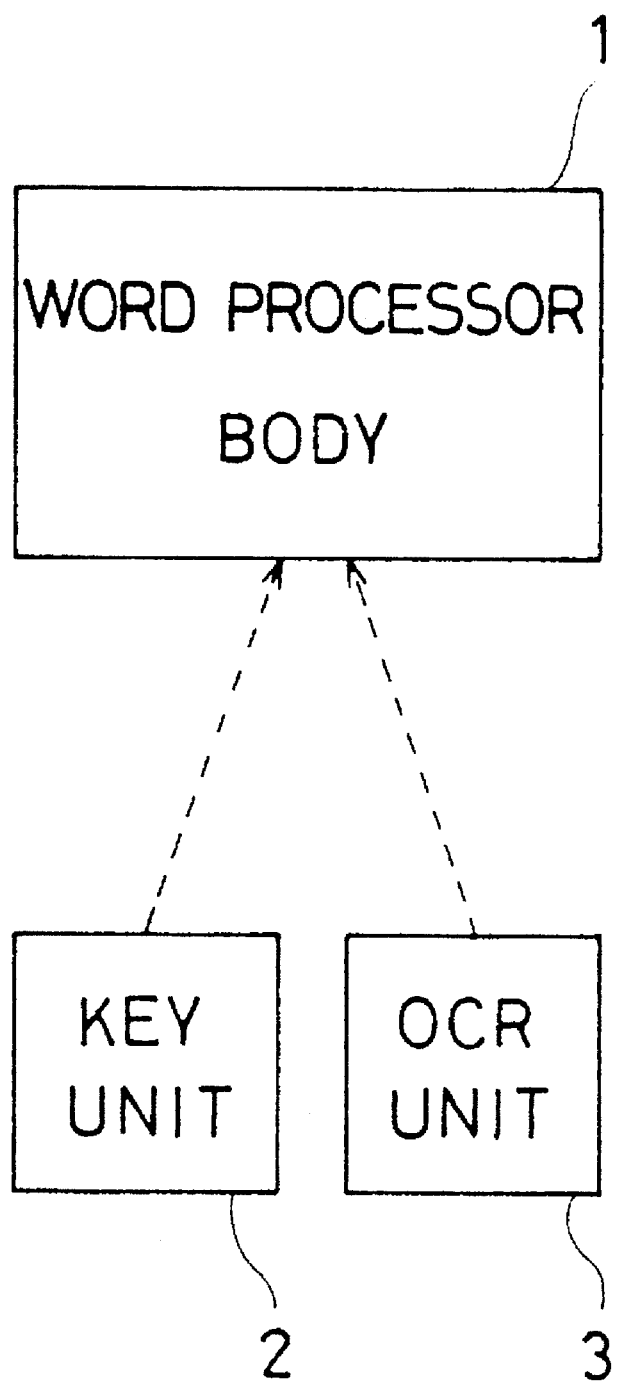
FIG. 1 is a block diagram showing an embodiment of the present invention.

FIG. 1 is a block diagram showing an embodiment of the present invention. In FIG. 1, a word processor body is indicated at 1, a key unit having a keyboard is indicated at 2, and an OCR (Optical Character Reader) is indicated at 3.

The key input data of the key unit 2 as one transmitter and the read data of the OCR 3 as another transmitter are converted into signaling light or electric waves and transmitted to the word processor body 1. The word processor body 1 receives the light or electric waves, and converts the same into electric signal data. More specifically, the key unit 2 and the OCR 3 have such a structure that delivers input to the word processor body 1 by wireless transmission. Since a basic wireless transmission structure is known, description thereon is omitted.

Figure 2:
FIG. 2 is a diagram for explaining the basic structure of transmitted data information according to the embodiment of the present invention.

FIG. 2 is a diagram for explaining the format of digital data information (serial data block) according to the inventive embodiment. Each data information is formed as a data sequence, but individual data structures differ from each other depending on the transmitter (that is, the key unit 2 or the OCR 3). The data content is solely determined by the transmitter. Accordingly, it is necessary for the receiver (that is, word processor body 1) to identify which transmitter is transmitting.

As shown in FIG. 2, the digital data information, also referred as a frame, is comprised of a 5-byte header, a data part, and a checksum (2 bytes) which indicates the sum of all bits in the frame. The header includes a control code (for example, 01H) which indicates the head of the data information, a device code which indicates the type of the transmitter, and an ID (identification) code for specifying devices which can communication to each other.

Referring to the function of the header, plural transmitters can communicate with an appropriate receiver by setting ID codes for the plurality of receivers. This prevents the possibility that the receiver misreads data from other receivers. Since the length of the actual data part is variable, the 2-byte data next to the ID code indicates the byte count of the data part. For example, the control code (1 byte) is assigned to be 00 to 1FH, and 01H indicates SOH (start of header). For example, the device code (1 byte) is assigned to be 20H to FFH and serially allocated to each transmitter. The receiver decides whether reception (or processing) is permitted by first processing the device codes, and then processing the subsequent data.

The ID code therefore specifies the combination of the transmitter and receiver communicating with each other, i.e., the transmitter and receiver having the same unique ID code can communicate with each other. For example, FFH indicates that the ID codes are not preset. In the case of a transmitter (key unit 2) in which a user can take the initiative of setting an ID code, the initial value is FFH. In the case of transmitter (OCR 3) in which the user cannot set any ID codes, some specific value is allocated in advance.

The data byte count expresses, in 2 bytes, the number of data bytes of the data part (in the order of LOW and HIGH). The checksum adds the data bits of the data part every 8 bits and it expresses the same in 16 bits. The checksum field may be omitted.

Once the header content is determined as noted above, the receiver is enabled to decide which transmitter is being received. However, it is also necessary for the receiver to accurately recognize whether the received data constitutes the header of some data information.

Figure 3:
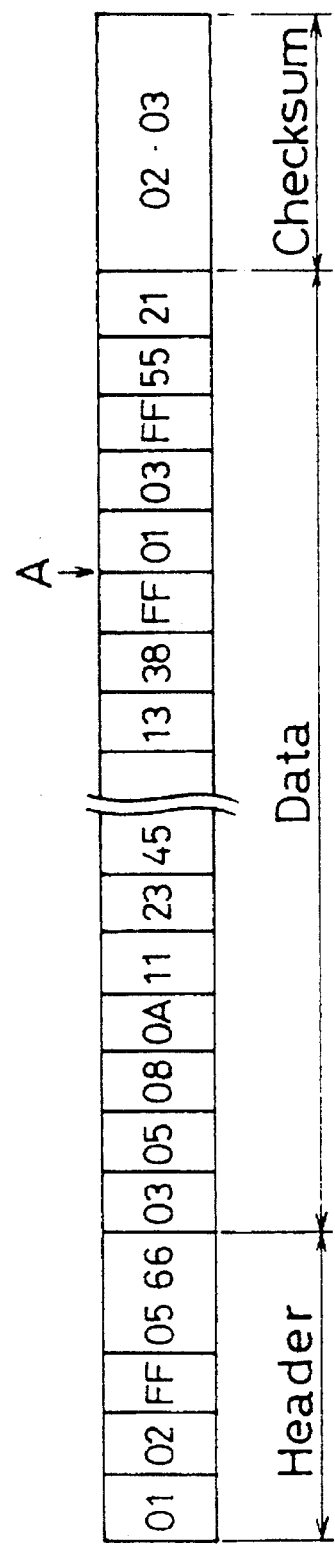
FIGS. 3(a) and 3(b) are diagrams showing a data structure according to the prior art.
Figure 3:
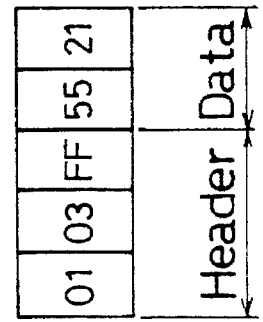

FIG. 3(*a*) shows bit-mapped data transmitted from an OCR according to the prior art. FIG. 3(*b*) shows data transmitted from a key unit according to the prior art. Assuming that data transmitted by the OCR 3 is temporarily interrupted, the receiver goes to a standby state to receive any new data (including a header) from the same or other transmitter. Then, if the OCR 3 resumes the transmission starting at the position A including the subsequent five bytes (01/03/FF/55/21), the receiver receives these bytes and erroneously interrupts them as the header from the key unit as shown in FIG. 3(*b*). Thus, the receiver misrecognizes the subsequent part from the OCR 3 as the header from the key unit 2.

Figure 4:
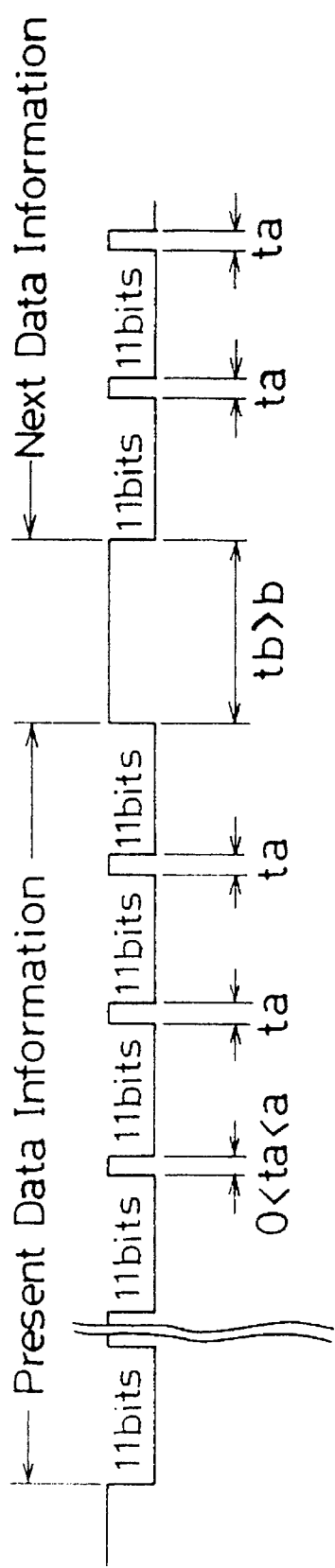
FIG. 4 is a diagram showing the intervals of the transmitted data according to the embodiment of the present invention.

To avoid such malfunctions in the present invention, a time management procedure shown in FIG. 4 is adopted. The transmitted data is divided into a plurality of bit strings. Each bit string or data unit includes 11 bits. In a series of bit strings, each 11-bit string of data is transmitted along with a time interval of ta (0<ta<a), where a is a constant time value, for example, 2.0 msec. In addition, consecutive bit string series are separated by a predetermined time interval of tb [tb>b (>a)], wherein b is a constant time value, for example, 10.0 msec.

Figure 5:
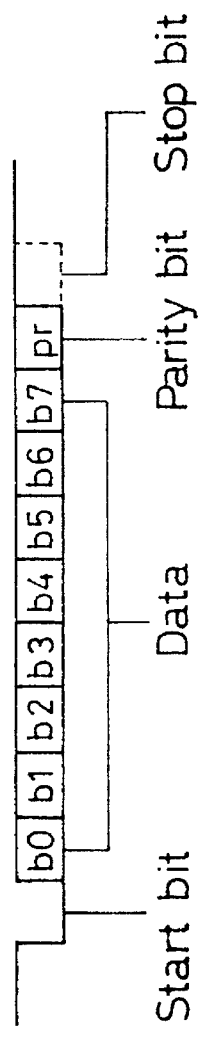
FIG. 5 is a diagram showing the structure of a main part shown in FIG. 4.

FIG. 5 shows the structure of the 11-bits of data in each bit string shown in FIG. 4. A start bit is "0", a stop bit is "1", and a parity bit indicates odd parity ("0" or "1" is outputted in such a manner that "1" including the parity bit becomes an odd number).

Figure 6A:
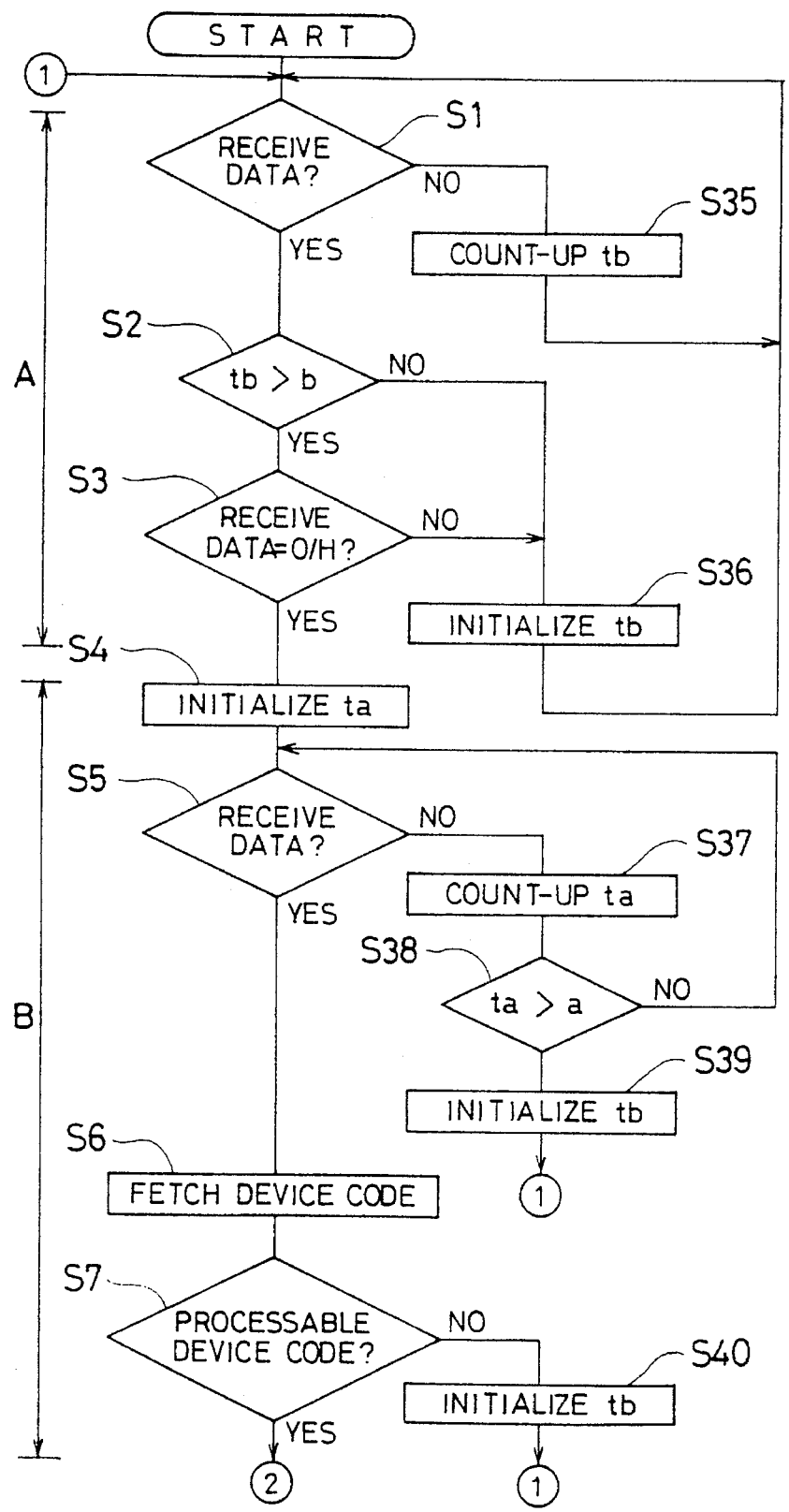
FIGS. 6(a) and 6(b) are flowcharts showing operations according to the embodiment of the present invention.
Figure 6:
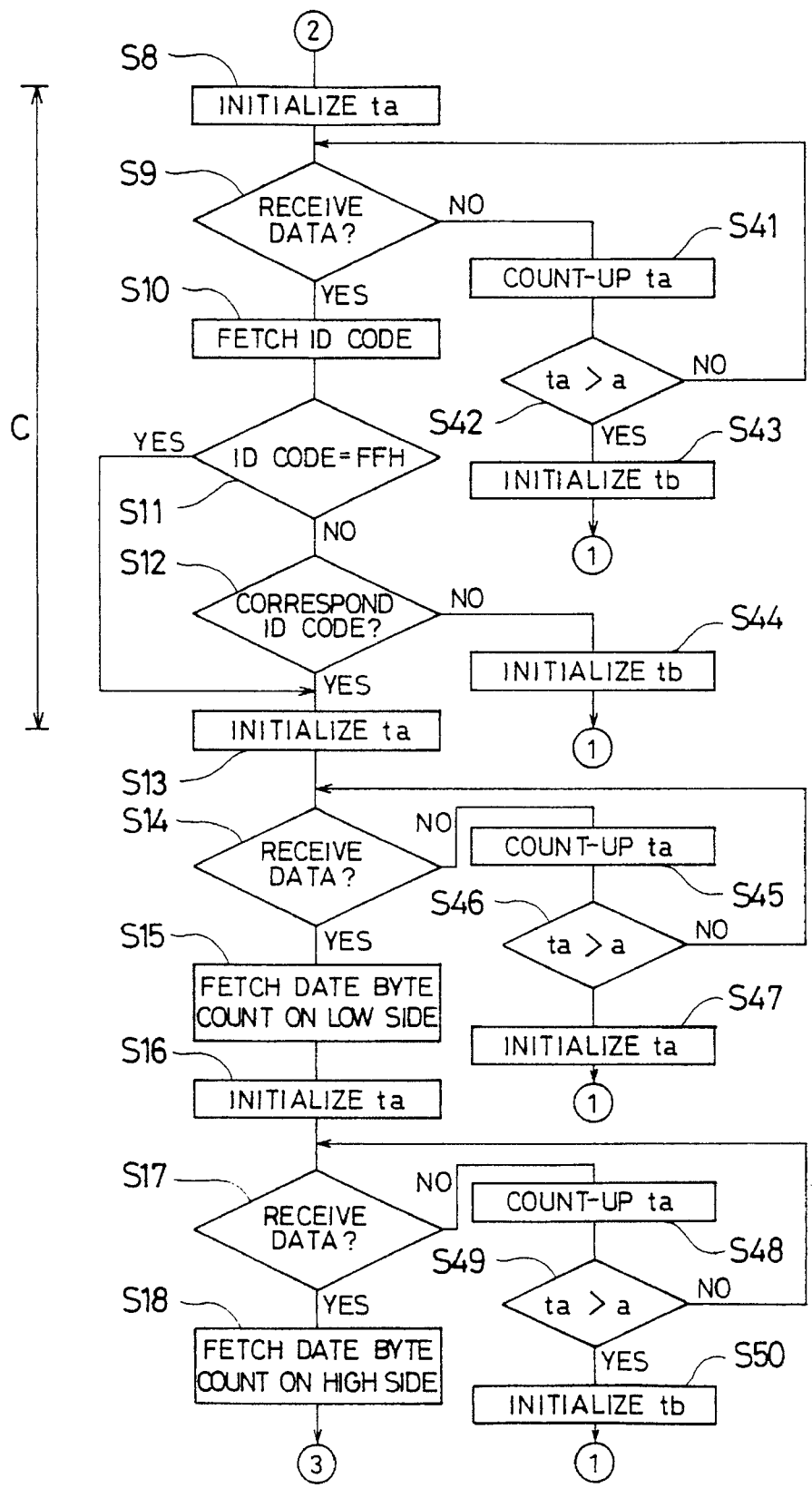

The procedures by which the data information having the protocol according to the present invention are now described in conjunction with FIGS. 6(*a*), 6(*b*), 7(*a*) and 7(*b*). In a part A (Steps S1 to S3, S35, S36) in FIG. 6(*a*), the receiver watches the time count to determine if the standby time reaches the time tb to identify a start of a new frame of data information. The receiver recognizes the received data as proper data only if the recognized interval tb is greater than b and the beginning of a header of the received data is 01H, and thereafter, continues to receive and analyze the header. In FIGS. 6(*a*), 6(*b*), 7(*a*) and 7(*b*), "count-up ta or tb" indicates a finding time ta or tb by time accumulation and "initialize ta or tb" indicates that the accumulated value of ta or tb is returned to 0.

In a part (B) (Steps S4 to S7, S37 to S40), the receiver receives a device code subsequent to 01H. The receivers waits for the data while accumulating the time ta to determine the interval between the bit strings. If ta is greater than a, the receiver decides that the transmission is interrupted or some abnormality has occurred. Then, this routine returns to the part A so that the receiver continuously discards the received data until the header of the next data information is read. If the received data is proper and correct, the receiver decides whether the transmission received from a particular transmitter can be processed, and determines the following received data are cancelled.

In a part C (Steps S8 to S12, S41 to S44), the receiver receives ID codes. When the ID code is FFH, it is not preset, and the identity conditions for the ID code are ignored. When the ID code is not FFH, the received ID code is checked against an ID code prestored in the receiver. If the received ID code does not correspond to the prestored ID code in the receiver, the receiver ignores the reception. In Steps S31 to S39 and S45 to S60, similarly, the receiver receives the data byte count, data and checksum.

Figure 7:
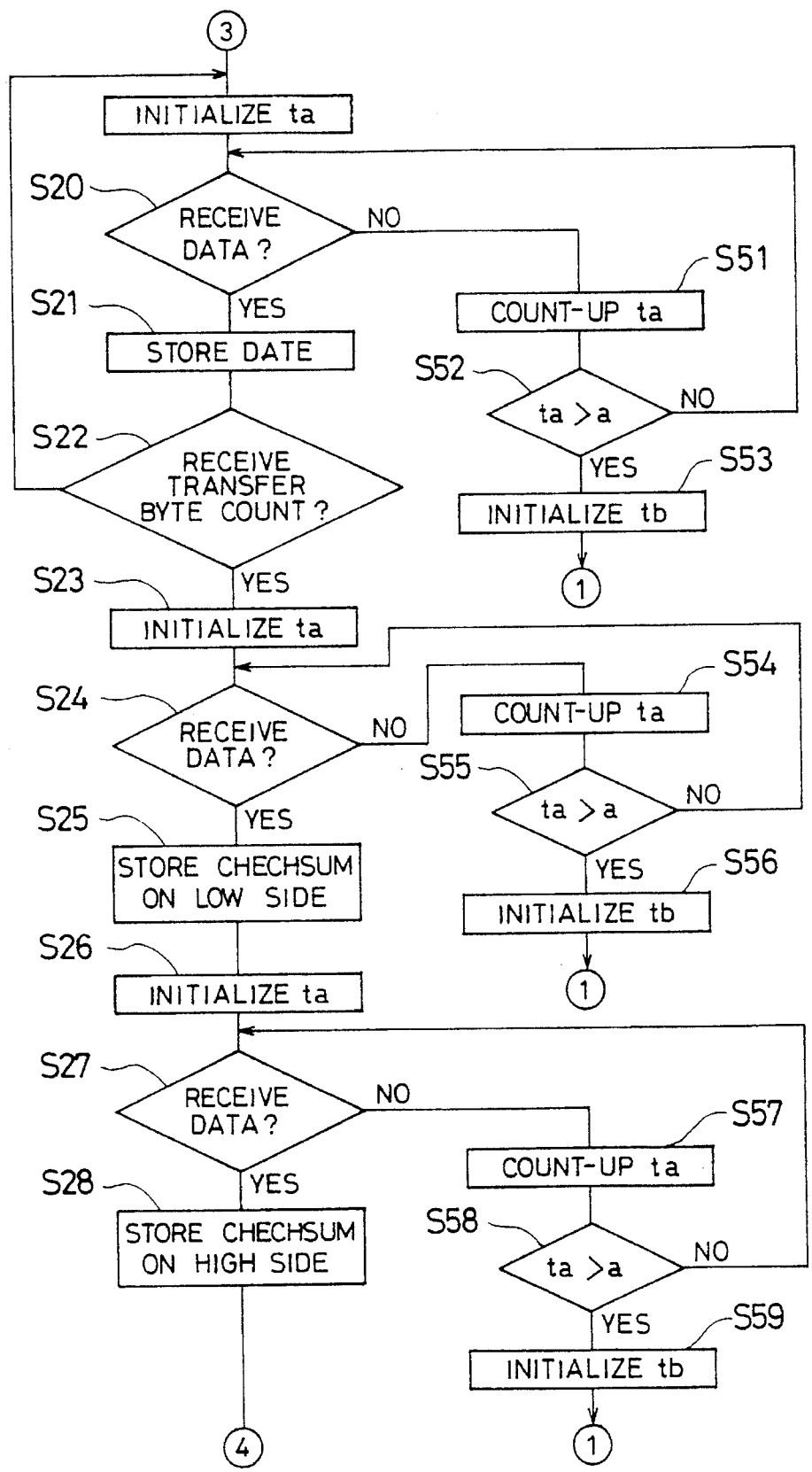
FIGS. 7(a) and 7(b) are flowcharts showing operations attendant on the operations shown in FIGS. 6(a) and (b) according to the embodiment of the present invention.
Figure 7:
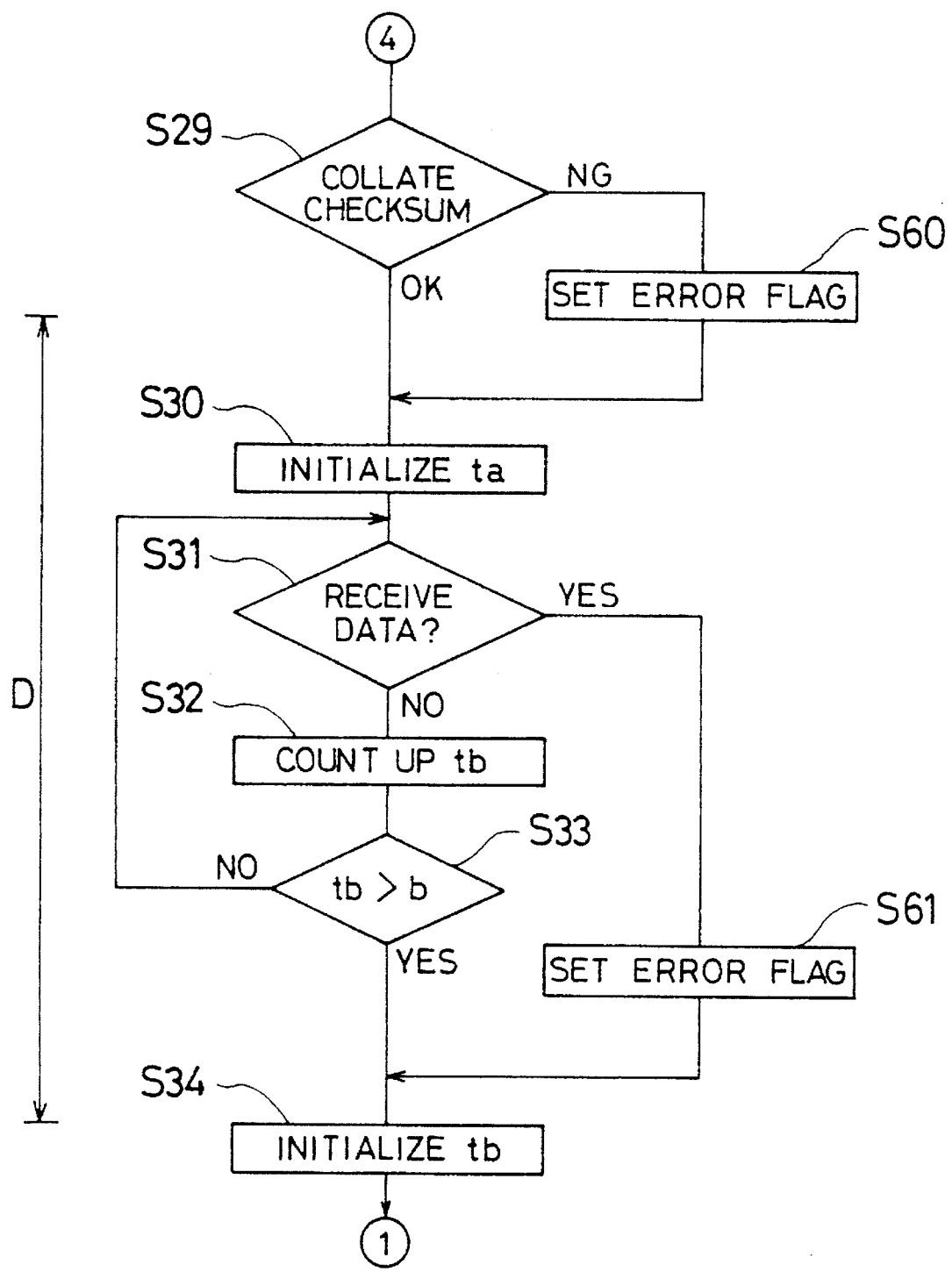

In a part D (Steps S30 to S34, S61) shown in FIG. 7(*b*), the receiver verifies that there are no continuous bit strings in terms of tb>b. If the next data is received in the state of tb<b, the receiver sets an error flag to indicate that the data received are improperly continuously transmitted from other transmitters and that a data abnormality has occurred. The example noted before with reference to FIG. 3 would be processed as an error in part D.

The above embodiment may be partially modified as follows. The predetermined time interval tb is determined based on the transmitter identification code (ID code) to specify the devices which can communicate with each other, and the transmitter and receiver prestore the time interval tb. When the receiver receives data, the receiver counts up the time interval tb and checks the time interval tb as well as the ID code to identify the transmitter which has transmitted the received data. Thereby, the receiver can identify the transmitter more accurately.

In summary, the present invention permits a receiver to accurately identify data transmitted asynchronously from plural transmitters. Various changes and modifications to the disclosed embodiments are readily envisioned and fully within the scope of the invention. The scope of the invention should be limited only the breadth of the claims.

What is claimed is:

1. A wireless signaling system comprising:

first and second transmitters each wirelessly transmitting serial frames of data each frame including identification information, each frame being divided into a series of bit strings each bit string including a start bit at the beginning of the bit string, data bits, a parity bit, and a stop bit at the end of the bit string, wherein the start and stop bits of consecutive bit strings are separated by a spacing time interval during which bits are not transmitted and each frame is separated from start and stop bits of adjacent frames by a preset time interval during which bits are not received, and a receiver for receiving a frame of wirelessly transmitted data from the first and second transmitters, detecting whether the received frame is separated from adjacent frames by the preset time interval during which bits are not received and whether the received bit strings within the received frame are separated by the spacing time interval during which bits are not transmitted, and decoding the identification information in the received frame.

2. The system of claim 1, wherein the receiver determines which of the first and second transmitters transmitted the received frame based on the decoded identification information.

3. The system of claim 2, wherein the receiver compares the decoded identification information with a receiver identification code to determine if the receiver is compatible with the transmitter transmitting the received frame.

4. The system of claim 1, wherein the preset time interval is greater than the spacing time interval.

5. The system of claim 1, wherein if a bit string in the received frame is not separated from the adjacent bit strings by at least the spacing time interval, the receiver ignores that bit string.

6. The system of claim 1, wherein if the received frame is not separated from the adjacent frames by at least the preset time interval, the received ignores the received frame.

7. The system of claim 1, wherein if the decoded identification information does not correspond to one of the first and second transmitter identification information, the receiver ignores the received frame.

8. The system of claim 1, wherein each frame includes a header portion, a message portion, and an error detection portion.

9. The system of claim 7, wherein the header portion includes the identification information that includes an identification code and a device code that indicates a type of transmitter, wherein the transmitter and the receiver must have the same identification code to be compatible for communication.

10. The system of claim 9, wherein the header includes a control code decoded by the receiver to detect the beginning of the header.

11. The system of claim 8, wherein a length of the message portion is variable in length and the header further includes a data length code to indicate the length of the message portion.

12. The system of claim 1, wherein the receiver monitors a detected time interval during which bits are not received and determines that a next received portion of data is a new frame if the detected time interval during which bits are not received exceeds the preset time interval, and if not, the receiver ignores the received bits.

13. The system of claim 1, wherein the first transmitter is installed in a wireless keyboard unit and the second transmitter is installed in a wireless character reader unit for transmitting output data to a word processor in which is installed the receiver to receive the transmitted output data, wherein a length of the frame transmitted by the wireless keyboard unit is different than a length of the frame transmitted by the wireless character reader unit.

14. A data processing system employing wireless signaling comprising:

a keyboard including a first transmitter for wirelessly transmitting serial frames of data, each frame being separated from adjacent frames by a preset time interval during which data are not transmitted and including identification information;

a optical character reader including a second transmitter for wirelessly transmitting serial frames of data, each frame being separated from adjacent frames by a preset time interval during which data are not transmitted and including identification information; and a word processor including a receiver for receiving a frame of wirelessly transmitted data from the first and second transmitters, detecting whether the received frame is separated from adjacent frames by the preset time interval, and decoding the identification information in the received frame.

15. The system in claim 14, wherein each frame includes identification information, each frame being divided into a series of bit strings, each bit string including a start bit at the beginning, data bits, a parity bit, and a stop bit, wherein the start and stop bits of consecutive bit strings are separated by a spacing time interval during which bits are not transmitted.

16. The system in claim 15, wherein each frame is separated from start and stop bits of adjacent frames by the preset time interval during which bits are not transmitted.

17. The system in claim 15, wherein the receiver detects whether the received bit strings within the received frame are separated between start and stop bits by the spacing time interval during which bits are not transmitted.

18. The system of claim 14, wherein the receiver determines which of the first and second transmitters transmitted the received frame based on the decoded identification information.

19. The system of claim 18, wherein the receiver compares the decoded identification information with a receiver identification code to determine if the receiver is compatible with the transmitter transmitting the received frame.

20. The system of claim 19, wherein the receiver determines the preset time interval during with bits are not transmitted between frames based on a transmitter identification code decoded from received identification information.

21. The system of claim 19, wherein the preset time interval is greater than the spacing time interval.

22. The system of claim 14, wherein the identification information includes a device code that indicates a type of transmitter and an identification code, and wherein the transmitter and receiver must have the same identification code to be compatible for communication.

23. The system of claim 15, wherein a length of a message portion of each frame is variable in length, the first transmitter message portion being a first length and the second transmitter message portion being a second different length, and wherein a header in each frame transmitted by the first and second transmitters includes a data length code to indicate the length of the message portion.

24. The system of claim 14, wherein the receiver monitors a detected time interval during which bits are not received and determines that a next received portion of data is a new frame if a detected time interval exceeds the preset time interval.

* * * * *